June 26, 1945.  C. OLSSON  2,379,033

TAPE CUTTING MACHINE

Filed Feb. 19, 1943  4 Sheets-Sheet 1

INVENTOR
CARL OLSSON
BY
ATTORNEY

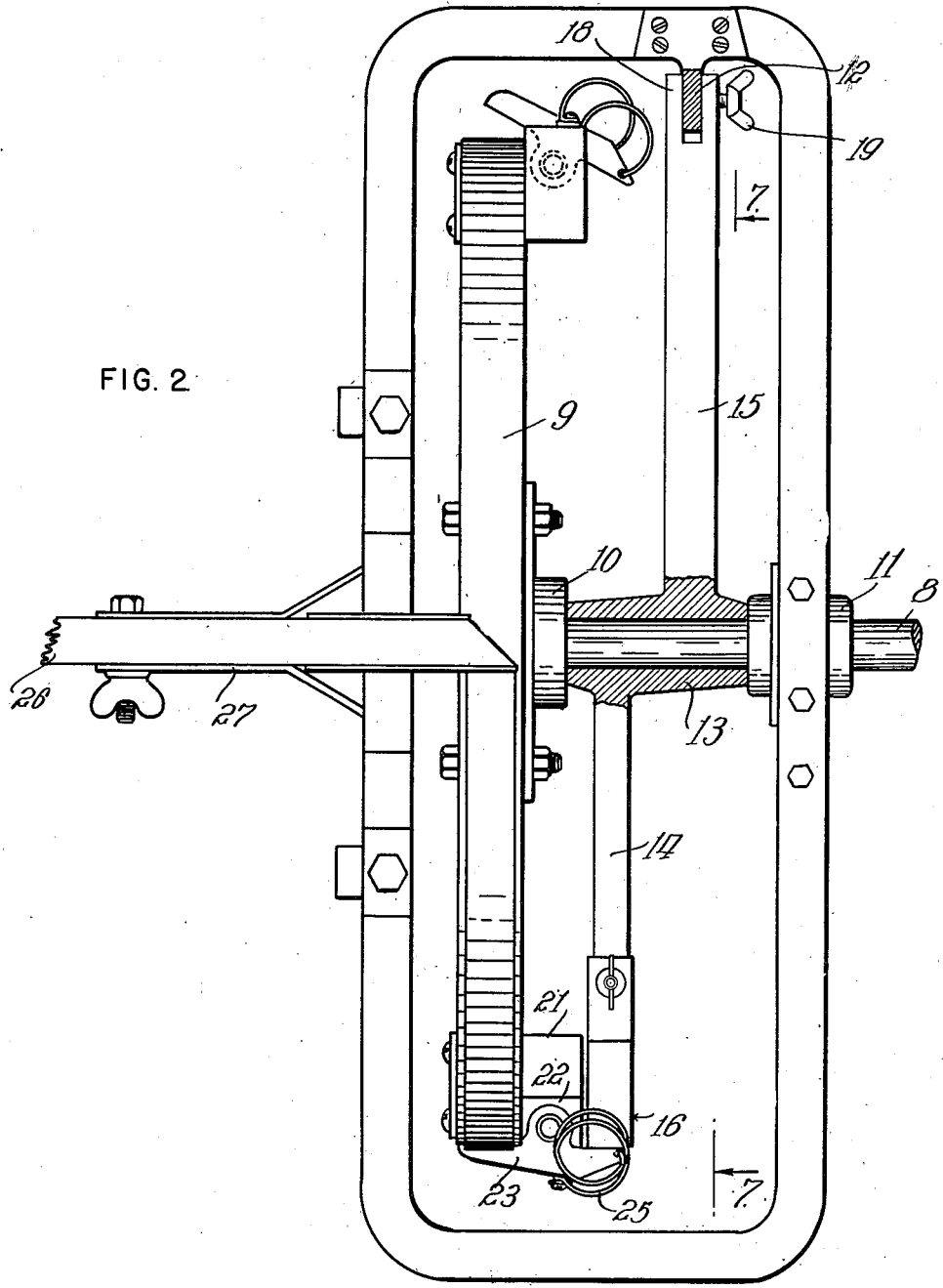

June 26, 1945.   C. OLSSON   2,379,033
TAPE CUTTING MACHINE
Filed Feb. 19, 1943   4 Sheets-Sheet 3
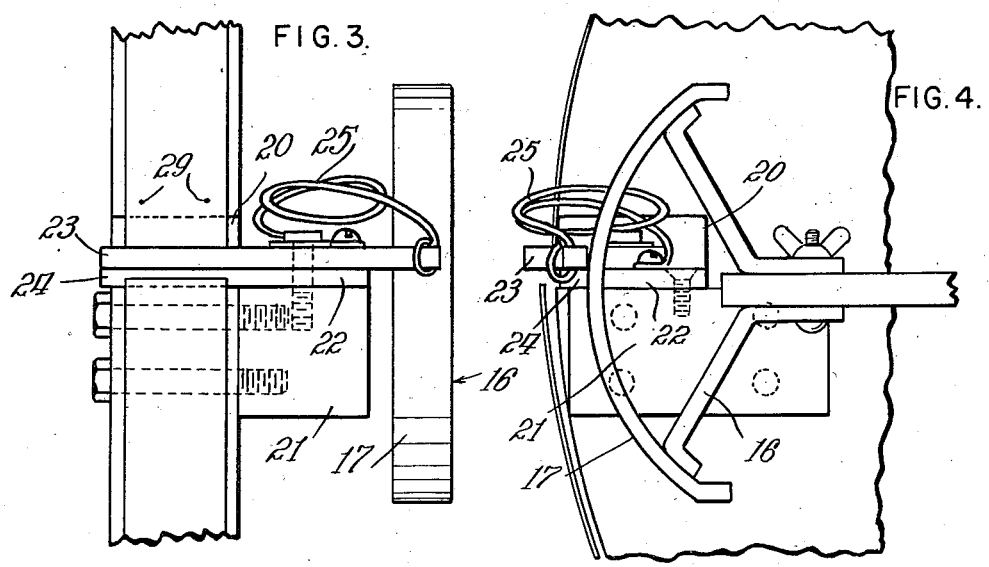
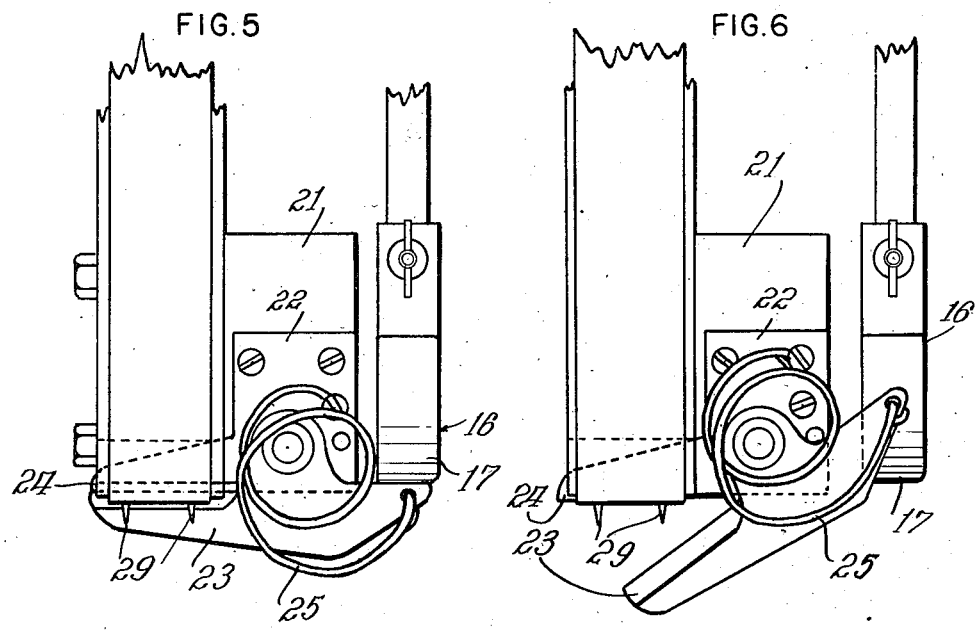
INVENTOR
CARL OLSSON
BY
ATTORNEY June 26, 1945.   C. OLSSON   2,379,033
TAPE CUTTING MACHINE
Filed Feb. 19, 1943    4 Sheets-Sheet 4

INVENTOR
CARL OLSSON
BY Rudolph M. Lotz
ATTORNEY

Patented June 26, 1945

2,379,033

UNITED STATES PATENT OFFICE 2,379,033

TAPE CUTTING MACHINE

Carl Olsson, St. Paul, Minn., assignor to The United States Bedding Company, St. Paul, Minn., a corporation of Minnesota Application February 19, 1943, Serial No. 476,394

10 Claims. (Cl. 164—42)

This invention relates to a machine for cutting textile fabric or other flexible tape or strips of material of a similar nature, into predetermined lengths with great accuracy and rapidity.

Another object of the invention is to provide a cheap and simple machine of the type indicated wherein variations in tape-lengths to be produced are effected with ease.

Other objects of the invention will be readily understood from the following specification.

A suitable embodiment of the invention is illustrated in the accompanying drawings, wherein:

Fig. 2 is a plan view of the same, the actuating mechanism thereof shown in Fig. 1 being omitted from illustration.

Fig. 3 is a fragmentary view in side elevation, the tape carrying wheel of the machine showing one of the tape shearing blades mounted thereupon in elevation with a part of the shearing blade riding upon a rigid cam mounted upon the machine frame.

Fig. 4 is a fragmentary side elevation of the tape carrying wheel and the shear-blade actuating cam of the machine and showing also a shearing blade of the latter in end elevation.

Fig. 5 is a view similar to Fig. 3 wherein one of the tape shearing devices is shown in side elevation with the shearing blade disposed at the inner limit of its movement.

Fig. 6 is a view similar to Figs. 3 and 5, showing a shearing blade of the machine at substantially the outer limit of its movement.

Figure 1:
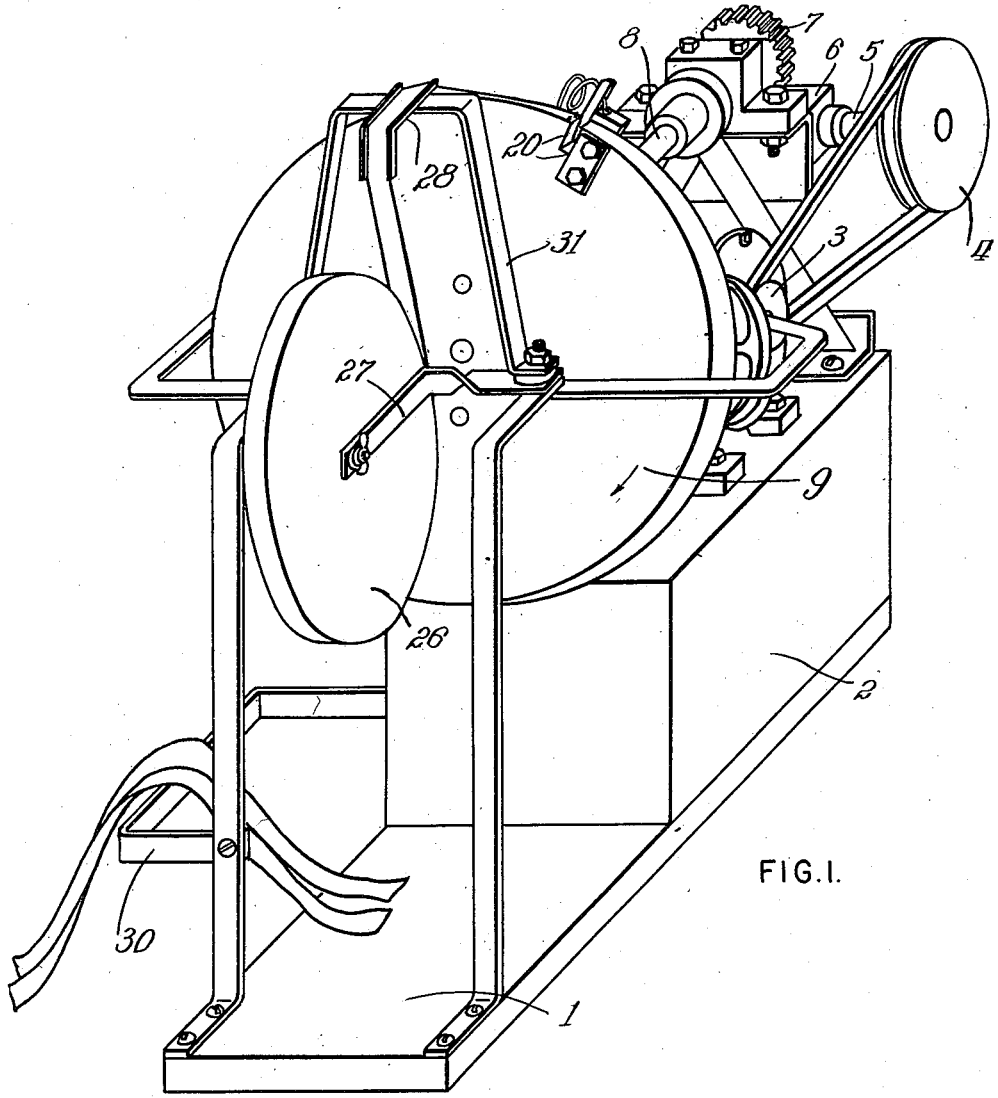
Fig. 1 is a perspective view of a machine constructed in accordance with the invention.

The machine comprises a suitable base plate 1 upon which there is mounted a support 2 for an electric motor (not shown) which drives a sheave 3. The latter is associated with the sheave 4 mounted upon a shaft 5 equipped with a worm in a suitable casing 6. The said worm drives the worm-wheel 7 which is rigid with a shaft 8 upon which a disc or wheel 9 is mounted for actuation thereby.

The wheel 9 is made, preferably, of a very light material or may be rendered very light by resort to a spoke structure. In the instance illustrated, the said wheel is made of wood, and is equipped with a metal hub element 10 mounted upon the end of the shaft 8. The latter is journalled in a bearing of the casing 6 and in a bearing 11 mounted upon the frame of the machine.

The frame of the machine is very light but needs no particular description since it is subject to structural variations to meet any requirements as to strength and rigidity. It includes a rigid arcuate member 12 disposed concentric with the shaft 8 and which is of a larger radius than the wheel 9, and is disposed in a vertical plane perpendicular to the shaft 8 and lying between the wheel 9 and the bearing 11.

Mounted rotatably upon the portion of the shaft 8 disposed between the bearing 11 and the hub element 10 of the wheel 9, is a sleeve 13 rigid or integral with diametrically opposed arms 14 and 15. The arm 14 carries a cam element 16 adjustable longitudinally thereof and having an arcuate face 17 of appreciably smaller radius than the wheel 9 with which said cam element is parallel. The arm 15 of said sleeve 13 is equipped with a forked end 18 in which the arcuate member 12 is received and is engaged by a set-screw 19 which serves to hold the cam element rigidly in any position to which it may be adjusted.

The wheel 9 is provided in its circumferential face with a pair of diametrically opposed recesses 20.

Mounted upon the wheel 9 adjacent to the respective recesses 20, is a pair of bracket elements 21 which are L shaped and each of which presents a substantially radially disposed flange 22 upon which a shear-blade 23 is pivotally mounted between its ends. The flange 22 includes a projection 24 extending through the recess 20 and which constitutes a companion shear element to the blade 23.

Springs 25 are suitably engaged with the flanges 22 and the shear blades 23 to hold the shearing end portions of said blades normally at the outer limits of their movement. The cam element 16 is disposed in the path of the other end portions of the shear-blades and act, in an obvious manner, to actuate them to effect shearing of the tape as they pass over said cam element.

The machine frame includes suitable means for mounting thereupon, removably, the center spool of a roll 26 of tape. In the instance illustrated said means consists of a pair of bracket arms 27 extending parallel with the shaft 8 but disposed opposite to the face of the wheel opposed to that to which the hub member 10 is secured. The outer ends of said bracket arms 27 are equipped with openings to receive a removable pivot element to be passed through the spool of the roll of tape.

The tape passes from the spool over a channeled guide plate 28, mounted rigidly upon the top of the machine frame and which overhangs the face of the wheel 9 and is disposed closely proximate to the latter, the said end portion of said guide plate being cut off at an angle of forty-five degrees to the side flanges thereof with the said angular edge opposed to the direction of rotation of the wheel 9.

The wheel 9 is equipped with a plurality of sharp pins 29 (Fig. 5) adjacent the shear elements 23 and 24 which engage in the tape at substantially its point of discharge at the angular end of the guide plate 28.

Upon mounting a roll of tape in place and disposing its end portion within the guide plate 28 and over the angular edge of the latter with its extremity disposed upon the perimeter of the wheel 9 at a point spaced from both recesses 20, the machine is started. As one of the sets of pins 29 passes the angular end of the plate 28, it engages the tape end portion and draws the tape over the perimeter of the wheel 9. As said pins 29 and the shear elements 23 and 24 pass over the cam 16, any excess extreme end portion of the tape is cut off; but the pins remain engaged in the body of the tape and continue to cause more of said tape to be drawn from the roll thereof.

As the next set of pins 29 passes said angular end of the plate 28 it engages in the tape from which the first-named end portion is cut off as the second set of shear elements 23 and 24 passes the cam 16. The cut-off length is then automatically released from the first-named set of pins 29 by relief of tension exerted upon the cut-off tape length, and thereafter the two shears operate alternately to cut tape lengths from the roll.

The wheel 9 may be equipped with three or four of the recesses 29 and shears 23 and 24 to cut off proportionately shorter lengths of tape, but in each instance the said recesses 20 must be spaced apart equally.

The purpose of rendering the cam element 16 adjustable about the axis of the wheel 9 is to cause the tape lengths to be cut off at a point spaced less distantly from the angular edge of the tape-guide than the distance between the shear elements of the wheel, thus to assure tension on the tape as the next set of pins 29 passes into engagement with the tape.

It will be noted, by reference to Fig. 1, that the machine frame includes a U-shaped part 30 pivotally secured to other frame parts. The middle bar portion 31 of member 30 is disposed parallel with the shaft 8 and in the path of the tape-lengths delivered from wheel 9 so that the same bridge said portion 31 and thus are easily picked up by an operator. The said member 30 may be swung into any desired position to cause the tape-lengths to bridge same in the manner shown in Fig. 1. Such delivery of tape-lengths results from positioning the cam member 16 to effect severings at a point which will effect throw of the tape lengths upon said bar 30.

Preferably, all the tape lengths cut by the machine will be equal to one-half of the circumference of the wheel 9. If the lengths are desired to be increased or decreased, the wheel 9 is replaced by either a larger or a smaller diameter wheel 9, and the cam element 16 is adjusted radially in harmony with such differences in diameter. To this end, the channeled guide plate 29 is also rendered adjustable vertically in any suitable manner, but in the instance illustrated, it and the yoke 31 upon which it is mounted are replaced by similar yokes of requisite heights to meet requirements incident to different diameter wheels 9.

The guide device 28 causes the passage of tape from the roll onto the face of the wheel 9 to be resisted frictionally to a degree sufficient to impose enough tension on said tape between the said guide device and the pins 29 to maintain the tape engaged with the latter. As the said pins are conical, they become disengaged easily from the tape as soon as said tension is relieved by severance of the tape and responsively to both gravity and centrifugal force. The latter acts to throw the tape lengths onto the bar 31 when the latter is properly positioned to receive them.

Figure 7:
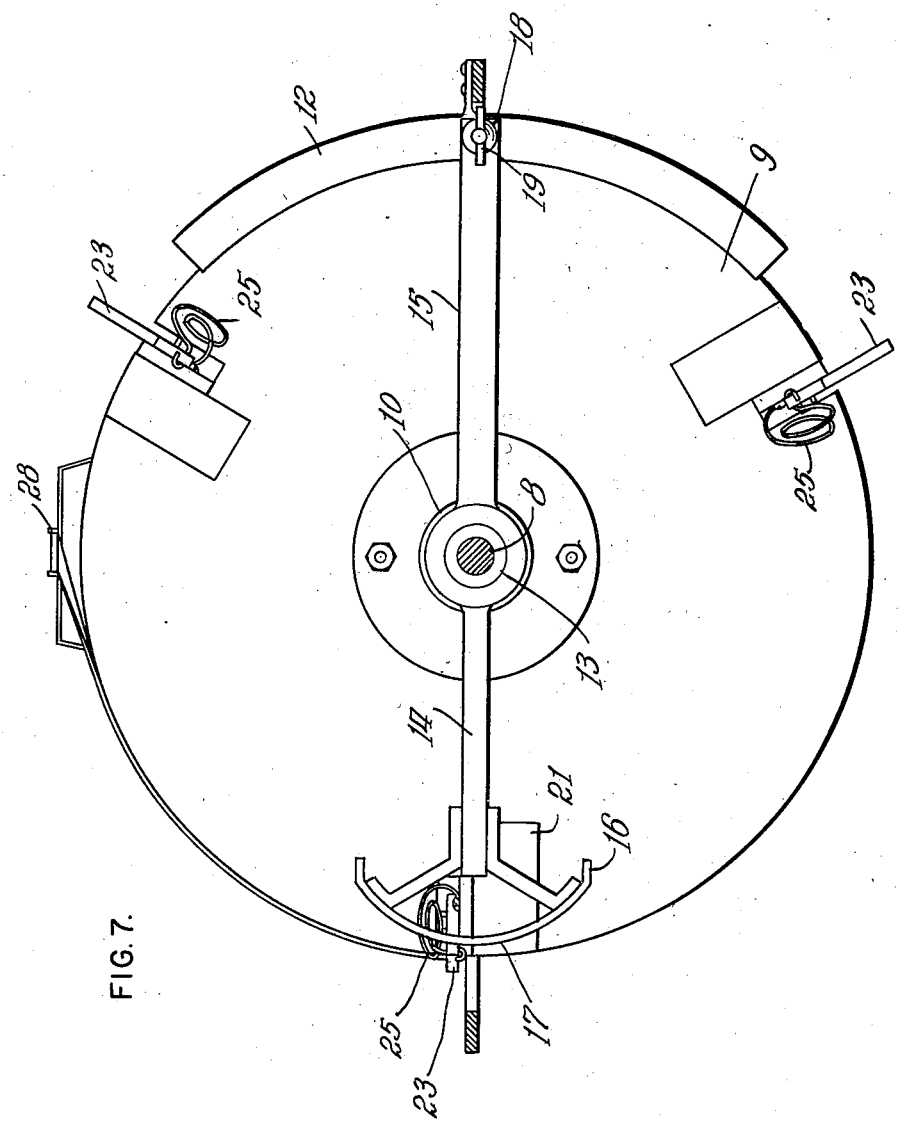
Fig. 7 is a fragmentary vertical sectional view taken on the line 7—7 of Fig. 2.

In Fig. 7 there is shown a wheel or disc 9 equipped with three equally spaced-apart notches and shearing devices for cutting three tape lengths for each revolution of said wheel or disc.

It is obvious, of course, that the notches and shearing means may be spaced apart otherwise than equally, if desired, to cut a variety of different tape lengths which would have to be assorted by the operator after their discharge from the machine.

I claim as my invention:

1. A machine of the type specified including a wheel equipped with a tape shearing means, a rigid cam element disposed in the path of and adapted to actuate said means at intervals during rotation of said wheel, the latter equipped with means disposed adjacent to said shearing means for engaging a tape with said wheel against slippage relative thereto, and a source of supply of tape including a means for guiding the same onto the perimeter of said wheel into the path of said tape engaging means.

2. A machine as defined in claim 1, wherein the tape engaging means comprises a plurality of conical pins adapted to penetrate the tape and wherein means are included for resisting the feed of tape from the source of supply and thereby tensioning the tape for causing the pins to engage therein.

3. A machine as defined in claim 1, wherein the shearing means are spring-held in open position and are actuated against the action of the spring holding means by said cam element.

4. A machine as defined in claim 1 wherein the guide means include means for resisting frictional passage of tape from a source of supply thereof onto the face of the wheel for cooperating with the tape engaging means to maintain the portion of the tape between the latter and said guide means under tension, and wherein the tape engaging means comprise conical pins adapted to engage in the tape to draw same from said guide between shearing operations and automatically release the tape following each shearing operation and consequent relief of said tension.

5. A structure as defined in claim 1 wherein the shearing means are plural and are equally spaced apart.

6. A structure as defined in claim 1 which includes a bar disposed in the path of tape lengths discharged from the machine to cause the portions of the latter between their ends to rest upon said bar.

7. A structure as defined in claim 1 wherein the shearing means are plural and equally spaced apart and wherein the cam element is spaced appreciably from the guide means and wherein the tape engaging means comprises conical pins disposed immediately behind the several shearing means, relative to the direction of rotation of the wheel and wherein means are included for resisting the feed of tape from the source of supply and thereby tensioning the tape for causing the pins to engage therein.

8. A structure as defined in claim 1 which includes a support for a roll of tape and a means for resisting frictionally the withdrawal of tape from the roll, and wherein the wheel is equipped with conical pins adapted to engage automatically in the tape at a point contiguous to the guide means.

9. A machine of the type specified including a wheel having a circumferential face flat in cross-section and adapted to be rotated continuously, a means on said face for engaging tape, a support for a roll of tape, guide means for leading the tape onto the face of the wheel and into the path of said tape engaging means, tape shearing means mounted upon the wheel adjacent to said tape engaging means, a means mounted upon the frame of the machine for actuating said shearing means at regular intervals during rotation of said wheel, said guide means affording frictional resistance to the travel of said tape to cause the same to cooperate with said tape engaging means to maintain the tape under tension between said guide means and said engaging means, the latter adapted to become disengaged from the wheel by relief of said tension following each shearing operation.

10. A machine of the type specified including a wheel having a circumferential face flat in cross-section and adapted to be rotated continuously, a means on said face for engaging the tape, guide means for leading the tape onto the face of the wheel into the path of said engaging means and including means for frictionally resisting the passage of tape from the roll and thereby maintain tension of tape between said guide means and said tape engaging means, tape shearing means mounted upon the wheel immediately in advance of said tape engaging means, and means rigid with the frame of the machine and disposed in the path of the shearing means for actuating the latter during travel thereof past said actuating means, said engaging means operating to automatically release the tape to effect discharge of a cut-off length of same following each shearing operation.

CARL OLSSON.